(12) United States Patent
Takemura et al.

(10) Patent No.: US 12,240,127 B2
(45) Date of Patent: Mar. 4, 2025

(54) WELDING SYSTEM, CONTROL DEVICE, AND WELDING METHOD

(71) Applicant: Kabushiki Kaisha Kobe Seiko Sho (Kobe Steel, Ltd.), Kobe (JP)

(72) Inventors: Yoshiya Takemura, Kanagawa (JP); Yasuyuki Saito, Kanagawa (JP); Youzhuo Jiao, Kanagawa (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 601 days.

(21) Appl. No.: 17/599,366

(22) PCT Filed: Feb. 14, 2020

(86) PCT No.: PCT/JP2020/005709
§ 371 (c)(1),
(2) Date: Sep. 28, 2021

(87) PCT Pub. No.: WO2020/202830
PCT Pub. Date: Oct. 8, 2020

(65) Prior Publication Data
US 2022/0184813 A1     Jun. 16, 2022

(30) Foreign Application Priority Data

Mar. 29, 2019   (JP) ................................ 2019-067011

(51) Int. Cl.
*B25J 9/00*     (2006.01)
*B23K 9/12*     (2006.01)
(Continued)

(52) U.S. Cl.
CPC ............... *B25J 9/1682* (2013.01); *B23K 9/12* (2013.01); *B23K 37/0229* (2013.01);
(Continued)

(58) Field of Classification Search
None
See application file for complete search history.

(56) References Cited

U.S. PATENT DOCUMENTS

2004/0056400 A1* 3/2004 Ghuman ................ B62D 65/02
269/71
2010/0174407 A1* 7/2010 Fukawa ............. B23K 26/0884
901/14
(Continued)

FOREIGN PATENT DOCUMENTS

| CN | 101941127 A | 1/2011 |
|---|---|---|
| CN | 109475963 A | 3/2019 |
| JP | 5883700 B2 | 3/2016 |

*Primary Examiner* — Truc M Do
(74) *Attorney, Agent, or Firm* — Oblon, McClelland, Maier & Neustadt, L.L.P.

(57) ABSTRACT

A welding system configured to weld a workpiece by using a welding device and a positioner includes a control device configured to control the welding device and the positioner. The positioner includes a workpiece position setting mechanism having reference position information, and at least one holding mechanism configured to hold the workpiece. The control device includes a positioner position calculation means for calculating a position of the holding mechanism when holding the workpiece based on the reference position information provided from the workpiece position setting mechanism and workpiece information inputted into the control device in advance.

15 Claims, 6 Drawing Sheets

(51) Int. Cl.
 *B23K 37/02* (2006.01)
 *B23K 37/047* (2006.01)
 *B25J 5/02* (2006.01)
 *B25J 9/16* (2006.01)
 *B25J 15/00* (2006.01)

(52) U.S. Cl.
 CPC .............. *B23K 37/047* (2013.01); *B25J 5/02* (2013.01); *B25J 9/1669* (2013.01); *B25J 15/0019* (2013.01)

(56) References Cited

U.S. PATENT DOCUMENTS

| | | | |
|---|---|---|---|
| 2012/0312862 A1* | 12/2012 | Landoll | B23K 37/0235 228/32 |
| 2016/0325386 A1* | 11/2016 | Farah | B25J 9/0096 |
| 2017/0355033 A1* | 12/2017 | Ito | B23K 9/048 |
| 2019/0262928 A1 | 8/2019 | Kishikawa et al. | |

* cited by examiner

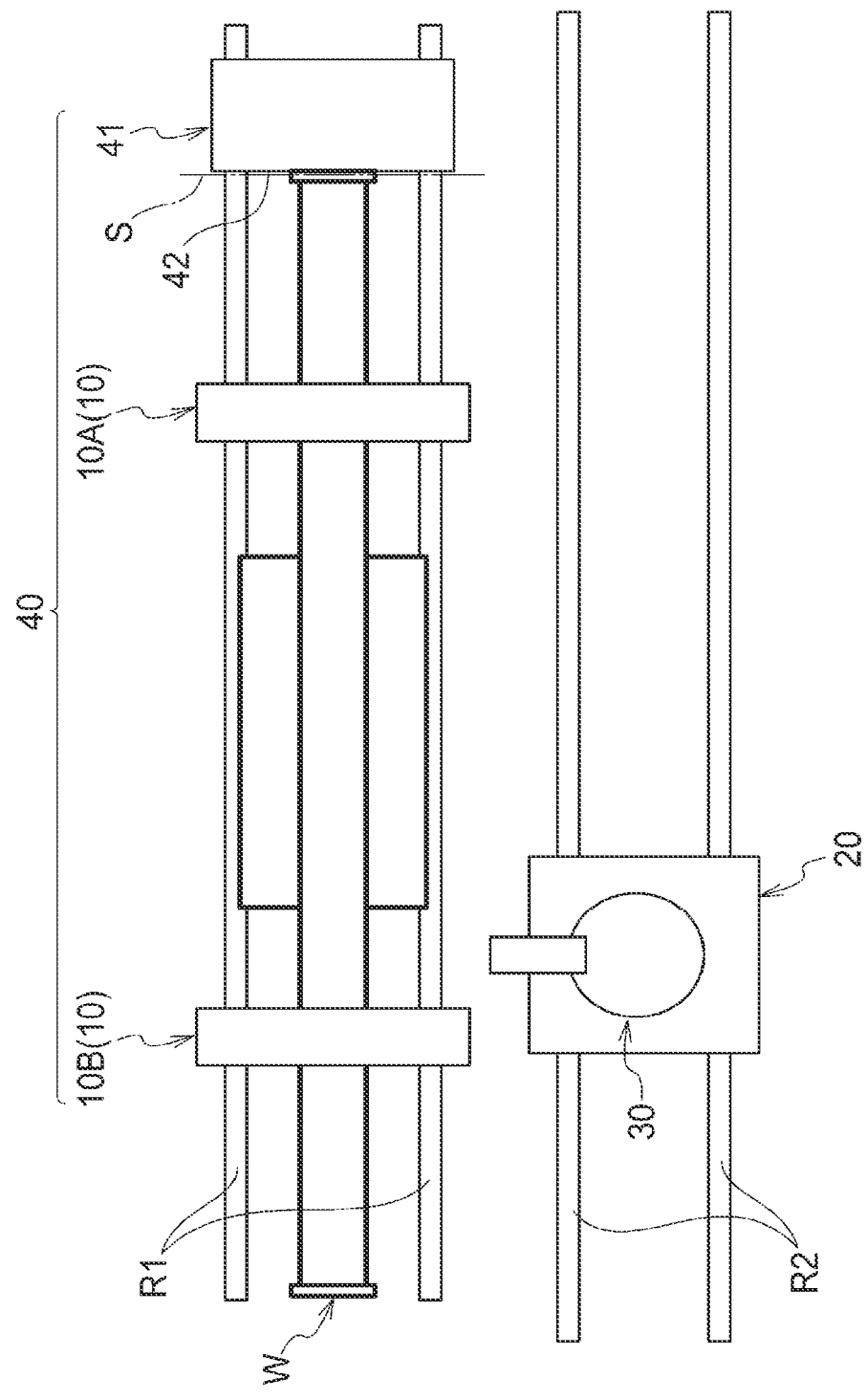

WELDING SYSTEM, CONTROL DEVICE, AND WELDING METHOD

TECHNICAL FIELD

The present invention relates to a welding system, a control device, and a welding method, and more specifically, to a welding system, a control device, and a welding method capable of automatically welding a large welding workpiece with a welding robot.

BACKGROUND ART

A welding device for automatically welding a large welding workpiece such as a steel frame structure with a welding robot has been disclosed so far. For example, a welding device disclosed in Patent Literature 1 includes a welding robot, a welding control device configured to control the welding robot, and a rotation positioner configured to hold a workpiece, and automatically generates an operating locus and a welding condition of the welding robot according to a welding robot locus and a welding condition prepared in advance, based on workpiece information such as a size of a steel frame structure and a shape of a welding joint inputted into an input means of the welding control device.

CITATION LIST

Patent Literature

Patent Literature 1: Japanese Patent No. 5,883,700

SUMMARY OF INVENTION

Technical Problem

For welding the workpiece, a work for positioning a workpiece and a positioner configured to hold the workpiece to appropriate positions is required. The work for positioning the positioner requires a very time-consuming and troublesome work, and is performed by trial and error based on years of experience of a worker, which is not efficient.

Note that, the welding device disclosed in Patent Literature 1 is to automate the welding work after determining positions of the workpiece and the rotation positioner, and does not particularly consider the work for positioning the rotation positioner.

The present invention has been made in view of the above situations, and an object thereof is to provide a welding system, a control device, and a welding method capable of automatically calculating a position of a positioner at a time when holding a workpiece and improving work efficiency by automating a work for positioning the positioner.

Solution to Problem

The object of the present invention is achieved by a configuration of a following (1) relating to a welding system.

(1) A welding system configured to weld a workpiece by using a welding device and a positioner, the welding system including:
a control device configured to control the welding device and the positioner,
wherein the positioner includes a workpiece position setting mechanism having reference position information, and at least one holding mechanism configured to hold the workpiece, and wherein the control device includes a positioner position calculation means for calculating a position of the holding mechanism when holding the workpiece based on the reference position information provided from the workpiece position setting mechanism and workpiece information inputted into the control device in advance.

The preferred embodiments of the present invention relating to the welding system relate to following (2) to (8).

(2) The welding system according to the above (1), wherein the control device has a database in which the position of the holding mechanism at a time when holding the workpiece is stored for each of the workpiece information, and
wherein the positioner position calculation means calculates the position of the holding mechanism at a time when holding the workpiece by referring to the database.

(3) The welding system according to the above (1) or (2), wherein the workpiece information includes at least one data of welding position data and size data of the workpiece.

(4) The welding system according to one of the above (1) to (3), wherein the control device includes a synchronous control unit configured to perform control such that an operation of the welding device and an operation of the positioner are synchronized with each other.

(5) The welding system according to one of the above (1) to (4), wherein the welding device is a welding robot, and
wherein the welding robot and the positioner each have a moving shaft that can move in parallel.

(6) The welding system according to the above (5), wherein the positioner has two or more holding mechanisms,
wherein when one of the holding mechanisms is set as a drive-side holding mechanism and other of the holding mechanisms is set as a driven-side holding mechanism, each of the drive-side holding mechanism and the driven-side holding mechanism has a servo motor for positioning to a predetermined position, and
wherein the control device is configured to control a position of the driven-side holding mechanism based on a position positioned in the drive-side holding mechanism, with respect to the position of the holding mechanism at a time when holding the workpiece calculated by the positioner position calculation means.

(7) The welding system according to one of the above (1) to (6), wherein the control device has a program automatic generation means for automatically generating an operating program for moving the holding mechanism and the welding device to the position of the holding mechanism at a time when holding the workpiece calculated by the positioner position calculation means.

(8) The welding system according to one of the above (1) to (7), wherein the workpiece information includes gravity center data of the workpiece, and
wherein the positioner position calculation means calculates the position of the holding mechanism at a time when holding the workpiece by referring to the gravity center data.

The object of the present invention is achieved by a configuration of a following (9) relating to a control device of a welding system.

(9) A control device of a welding system configured to weld a workpiece by using a welding device and a positioner,
wherein the control device is to control the welding device and the positioner, and wherein the control device includes a positioner position calculation means for calculating a position of a holding mechanism of the positioner at a time when holding the workpiece based on reference position information provided from a workpiece position setting mechanism of the positioner and workpiece information inputted into the control device in advance.

The object of the present invention is achieved by a configuration of a following (10) relating to a control program of a welding system.

(10) A control program of a welding system configured to weld a workpiece by using a welding device and a positioner, wherein the control program is to control the welding device and the positioner, and wherein the control program includes a positioner position calculation step of calculating a position of a holding mechanism of the positioner at a time when holding the workpiece based on reference position information provided from a workpiece position setting mechanism of the positioner and workpiece information inputted into the control program in advance.

The object of the present invention is achieved by a configuration of a following (11) relating to a welding method.

(11) A welding method of welding a workpiece by using a welding device and a positioner, the welding method including:

a process of controlling the welding device and the positioner by a control device configured to control the welding device and the positioner, wherein the positioner includes a workpiece position setting mechanism having reference position information, and at least one holding mechanism configured to hold the workpiece, and wherein the welding method includes a process of calculating a position of the holding mechanism at a time when holding the workpiece based on the reference position information provided from the workpiece position setting mechanism and workpiece information inputted into the control device in advance.

Advantageous Effects of Invention

According to the welding system, the control device, and the welding method of the present invention, it is possible to automatically calculate the position of the positioner at a time when holding the workpiece, and to improve work efficiency by automating the work for positioning the positioner.

BRIEF DESCRIPTION OF DRAWINGS

FIG. 3 is an outline configuration view of the welding system shown in FIG. 1, as seen from above.

DESCRIPTION OF EMBODIMENTS

<1. Welding System>

A welding system according to an embodiment of the present invention will be described with reference to FIGS. 1 to 4.

A welding system 1 is to weld a steel frame structure W, which is a workpiece for welding, by gas shielded arc welding, for example.

Figure 1:
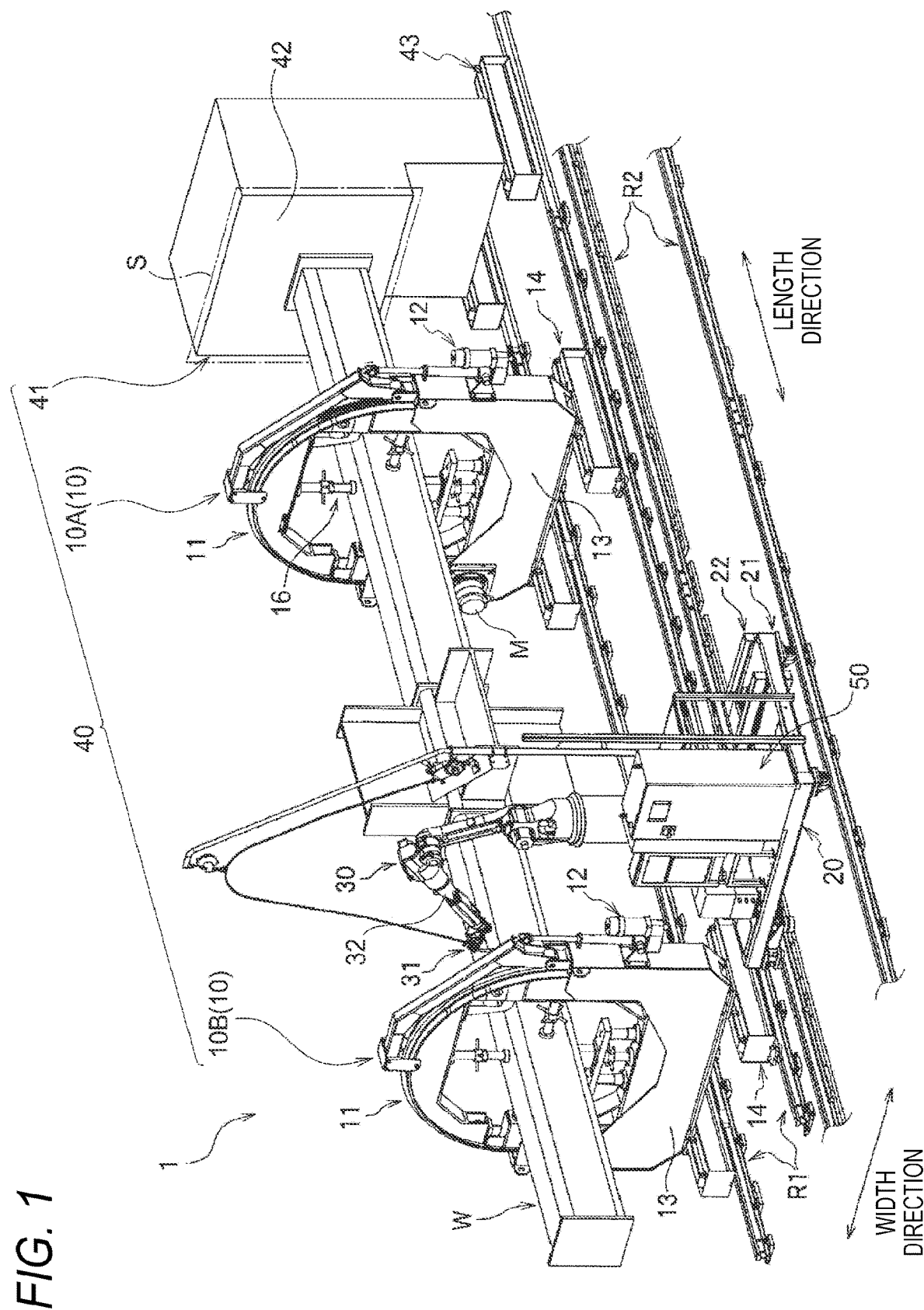
FIG. 1 is a schematic view showing an entire configuration of a welding system according to an embodiment of the present invention.

As shown in FIG. 1, the welding system 1 includes a carriage 20 for a welding device and a control device, a welding robot 30 that is a welding device, a positioner 40 for holding the steel frame structure W in a predetermined position, and a control device 50 configured to control the welding robot 30 and the positioner 40.

Figure 4:
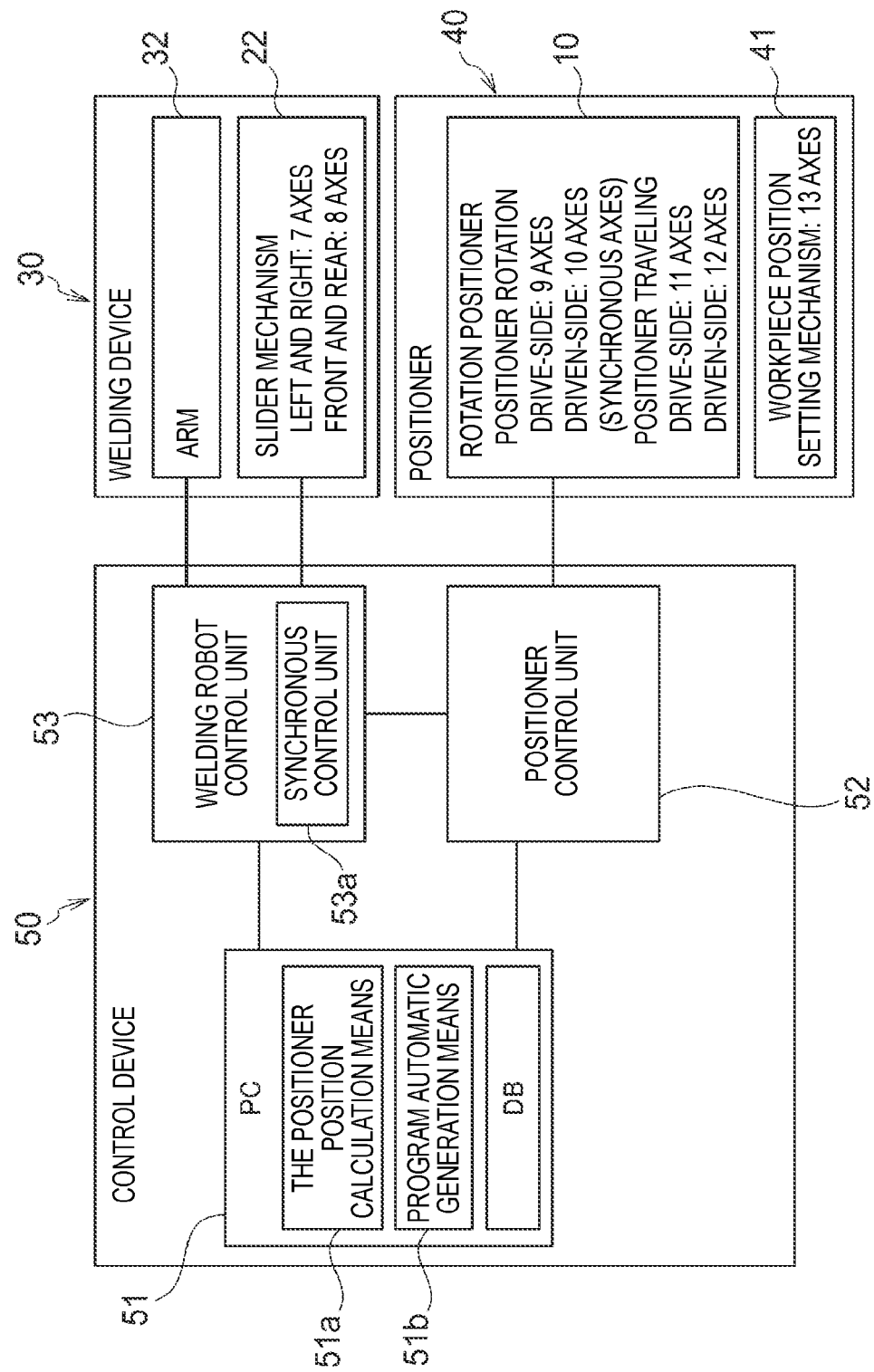
FIG. 4 is a schematic block diagram of the welding system shown in FIG. 1.

Referring to FIG. 4, the welding robot 30 includes a slider mechanism 22 configured to move the mounted welding robot 30 toward or away from the steel frame structure W, and a manipulator 32 with 6-axis joints.

The positioner 40 includes a pair of rotation positioners 10, which are holding mechanisms for the steel frame structure W, and a workpiece position setting mechanism 41.

The control device 50 includes a PC (Personal Computer) 51 configured to control an entire operation of the welding system 1, a positioner control unit 52, and a welding robot control unit 53. The PC 51 also has a database DB in which optimal positions of the holding mechanisms 10 at a time when holding the workpiece W are stored for each of workpiece information such as size data, welding position data or gravity center data and the like of the steel frame structure W, which will be described later.

[1-1. Positioner]

As described above, the positioner 40 includes the pair of rotation positioners 10, which are holding mechanisms for the steel frame structure W, and the workpiece position setting mechanism 41.

(1-1-1. Rotation Positioner)

The rotation positioners 10 are to hold and rotate the steel frame structure W during welding. As shown in FIG. 1, the rotation positioners 10 of the present embodiment are constituted by a pair of a drive-side rotation positioner 10A that is a drive-side holding mechanism and a driven-side rotation positioner 10B that is a driven-side holding mechanism, and are configured to hold the pillar-shaped steel frame structure W in at least two points in a length direction of the steel frame structure W.

When welding a linear part of the steel frame structure W by the welding robot 30, the rotation positioners 10 do not rotate the steel frame structure W, and when welding an arc part of the steel frame structure W by the welding robot 30, the rotation positioners 10 rotate the steel frame structure W. Thereby, the welding system 1 can continuously weld not only the linear part but also the arc part of the steel frame structure W without cutting arc. As shown in FIG. 1, the rotation positioner 10 of the present embodiment includes an annular holder 11, an elevating arm mechanism 12, a bracket 13, and a carriage 14 for a rotation positioner. Note that, the arc part of the steel frame structure W is formed at a corner part.

Figure 2A:
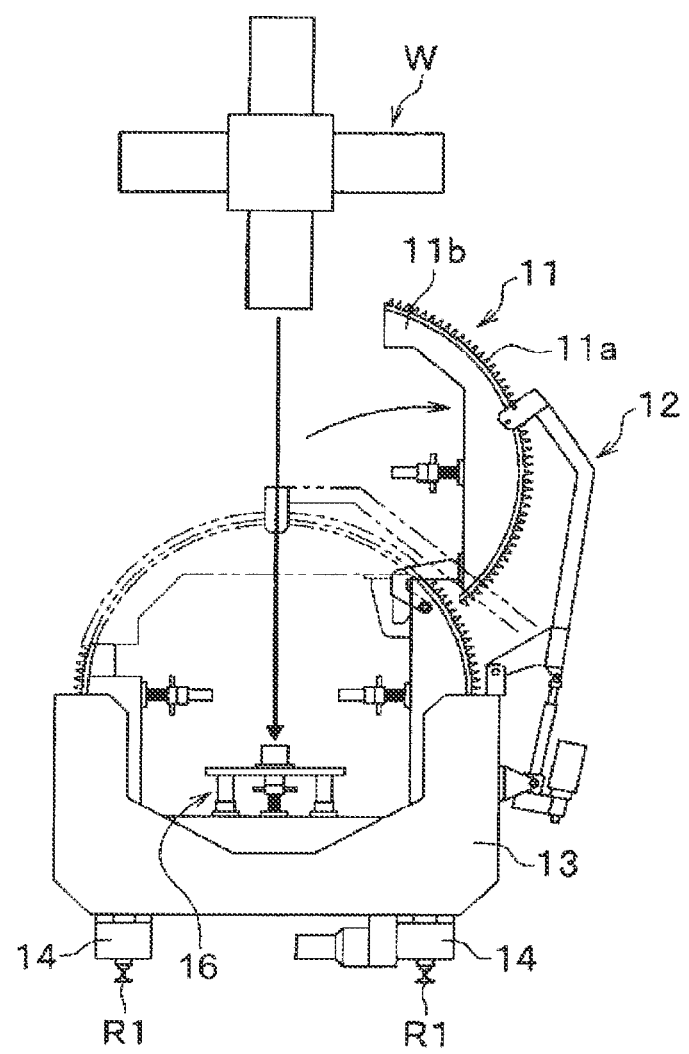
FIG. 2A is a schematic view for illustrating a configuration and an operation of a rotation positioner of the welding system according to the embodiment of the present invention, showing a state where an arc part of an annular holder is opened.

The annular holder 11 is to accommodate and hold therein the steel frame structure W. As shown in FIG. 1, a plurality of fixing jigs 16 for holding the steel frame structure W from all around is provided to be expandable and contractible on an inner side of the annular holder 11. The annular holder 11 is configured to clamp and fix the steel frame structure W from all around by the plurality of fixing jigs 16. As shown in FIG. 2A, a gear 11a is formed on an outer periphery of the annular holder 11, and the gear 11a is configured to mesh with a pinion gear (not shown) provided in the bracket 13. Note that, the gear 11a is not shown in FIG. 1.

The elevating arm mechanism 12 is to divide and open and close the annular holder 11. As shown in FIG. 2A, the elevating arm mechanism 12 is provided on a side of the annular holder 11 and the bracket 13, and one end-side is connected to an upper part of the annular holder 11 and the other end-side is connected to a side surface of the bracket 13.

Figure 2B:
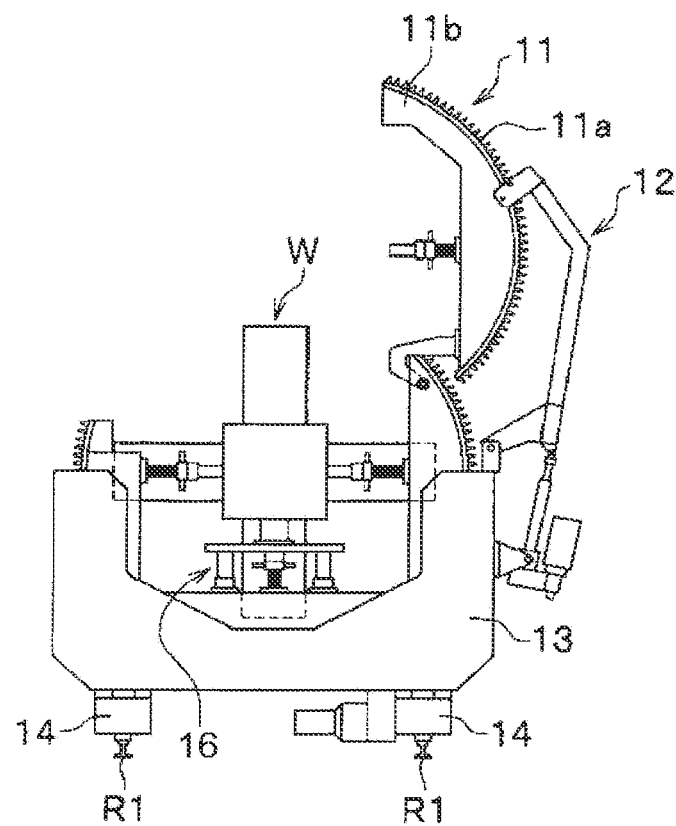
FIG. 2B is a schematic view for illustrating the configuration and the operation of the rotation positioner of the welding system according to the embodiment of the present invention, showing a state where a steel frame structure is accommodated in the annular holder.
Figure 2C:
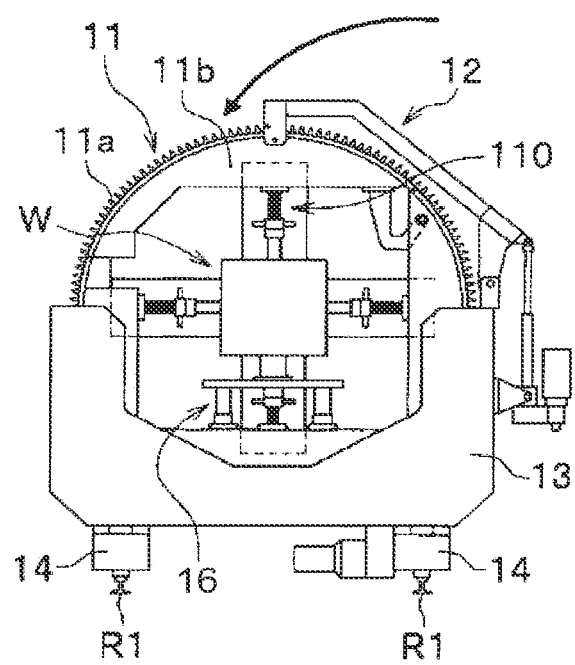
FIG. 2C is a schematic view for illustrating the configuration and the operation of the rotation positioner of the welding system according to the embodiment of the present invention, showing a state where the arc part of the annular holder is closed.

As shown in FIG. 2A, the elevating arm mechanism 12 is, specifically, configured to divide and open the annular holder 11 in a predetermined position, and to rotate an arc part 11b, which is a part of the annular holder 11, in a clockwise direction to space the arc part from the other part of the annular holder 11, thereby forming a state in which the steel frame structure W can be accommodated. After the steel frame structure W is accommodated as shown in FIG. 2B, the elevating arm mechanism 12 is configured to rotate the arc part 11b in a counterclockwise direction to again close the arc part 11b, and to clamp and hold the steel frame structure W by the four fixing jigs 16 provided on the inner side of the annular holder 11.

The bracket 13 is to accommodate the annular holder 11. As shown in FIG. 2A, the bracket 13 has such a shape of accommodating a lower half of the annular holder 11 and exposing an upper half of the annular holder 11. In the bracket 13, a pinion gear (not shown) arranged to mesh with the gear 11a of the annular holder 11 and a drive unit M configured to drive the pinion gear are provided. Note that, the drive unit M may be provided for at least one of the pair of rotation positioners 10, so that the other rotation positioner 10 is driven by rotation of one rotation positioner 10. A reference sign 10A in FIG. 1 indicates a drive-side rotation positioner, and a reference sign 10B indicates a driven-side rotation positioner.

The carriages 14 for a rotation positioner are to cause each of the rotation positioners 10 to be movable along moving rails R1 for a positioner. As shown in FIG. 1, the carriages 14 for a rotation positioner are provided at a lower part of each of the rotation positioners 10 by a pair, and are configured to cause the rotation positioners 10 to be independently movable in the length direction of the steel frame structure W by a servo motor (not shown).

Note that, as described above, the rotation positioners 10 are each configured so that the gear 11a formed on the outer periphery of the annular holder 11 and the pinion gear provided in the bracket 13 mesh with each other. Therefore, the rotation positioner 10 can rotate the annular holder 11 by the drive of the drive unit M, thereby rotating the steel frame structure W during welding work.

(1-1-2. Workpiece Position Setting Mechanism)

As shown in FIG. 1, the workpiece position setting mechanism 41 is arranged on a carriage 43 for a workpiece position setting mechanism capable of moving in the length direction of the steel frame structure W along the moving rails R1 for a positioner. Also, as shown in FIGS. 1 and 3, a side surface of the workpiece position setting mechanism 41 is provided with a reference surface 42 for setting a reference position S in the length direction of the steel frame structure W by bringing one end of the steel frame structure W into contact with the reference surface, for example. Specifically, as described later, the workpiece position setting mechanism 41 has reference position information of the steel frame structure W, which is used so as to calculate optimal positions of the holding mechanisms 10 at a time when holding the workpiece W.

Note that, it is not necessarily required to bring one end of the steel frame structure W into contact with the reference surface 42 when setting the reference position S in the length direction of the steel frame structure W. For example, a slight gap may be provided between the reference surface 42 and one end of the steel frame structure W. In this case, the gap is preferably smaller than 10 mm.

In addition, the reference surface 42 is not required to be the side surface of the workpiece position setting mechanism 41, i.e., a physical wall surface, like the present embodiment, as along as the reference position S in the length direction of the steel frame structure W can be set. For example, it is also possible to set the reference position S in the length direction of the steel frame structure W by using a non-contact means such as a laser sensor.

[1-2. Carriage for Welding Device and Control Device]

The carriage 20 for a welding device and a control device is to place thereon a welding mechanism that constitutes the welding system 1. As shown in FIG. 1, the carriage 20 for a welding device and a control device has a flat plate shape. A lower part of the carriage 20 for a welding device and a control device is provided with wheels 21, and the carriage 20 for a welding device and a control device is configured to be movable along moving rails R2 for a welding device and a control device by the wheels 21 that are driven by a motor (not shown). Specifically, the carriage 20 for a welding device and a control device is provided to be movable in parallel to the moving direction of the rotation positioners 10 as the length direction of the steel frame structure W.

A slider mechanism 22 that is driven by the motor (not shown) is provided at an upper part of the carriage 20 for a welding device and a control device, and the welding robot 30 and the control device 50 are placed on an upper part of the slider mechanism 22. The slider mechanism 22 is configured to be movable in a direction orthogonal to the moving direction of the rotation positioners 10, i.e., the length direction of the steel frame structure W, on the carriage 20 for a welding device and a control device. Therefore, the welding robot 30 placed on the upper part of the slider mechanism 22 is configured to be movable in the direction orthogonal to the moving direction of the rotation positioners 10 during welding. Note that, a wire supply receptacle configured to accommodate a welding wire that is supplied to a welding torch 31 (which will be described later), a nozzle exchange device configured to exchange a nozzle provided at a distal end of the welding torch 31, a nozzle cleaning device configured to clean the nozzle, a wire cutting device configured to cut the welding wire, a slag removing device configured to remove slag that is generated at a welding part, and the like, which are all not shown, may be placed on the upper part of the slider mechanism 22.

[1-3. Welding Robot]

The welding robot 30 is to weld the steel frame structure W. As shown in FIG. 1, the welding robot 30 includes a welding torch 31 configured to supply a welding wire to a distal end portion of the manipulator 32. The welding torch 31 is connected to a welding power source (not shown), and power is supplied to the welding wire via the welding torch 31.

The welding robot 30 is placed on the carriage 20 for a welding device and a control device via the slider mechanism 22, and as described above, is provided to be movable in the moving direction of the rotation positioners 10 and in the direction orthogonal to the moving direction of the rotation positioners 10. Note that, in FIG. 1, the welding robot 30 is arranged between the pair of rotation positioners 10, and is configured to weld a weld joint between the pair of rotation positioners 10. The moving direction of the rotation positioners 10 also corresponds to the length direction of the steel frame structure W, and the direction orthogonal to the moving direction of the rotation positioners 10 corresponds to a width direction of the steel frame structure W.

[1-4. Control Device]

The control device 50 is to control operations of the rotation positioners 10, the carriages 14 for a rotation positioner, the carriage 20 for a welding device and a control device, the slider mechanism 22, the welding robot 30, the carriage 43 for a workpiece position setting mechanism, and the like.

Here, as shown in FIG. 4, the control device 50 includes a PC 51 configured to control an entire operation of the welding system 1, a positioner control unit 52 configured to control an operation of the positioner 40, and a welding robot control unit 53 configured to control a welding operation of the welding robot 30.

(1-4-1. PC)

The PC 51 has a positioner position calculation means 51*a*, a program automatic generation means 51*b*, and a database DB in which optimal positions of the rotation positioners 10 at a time when holding the steel frame structure W are stored for each of workpiece information such as size data, welding position data or gravity center data and the like of the steel frame structure W.

Note that, as used herein, the database is a collection of information and the like stored in which predetermined distances should be maintained so as to prevent interference between the welding robot 30 and the rotation positioners 10 when welding the steel frame structure W having predetermined workpiece information, for example. Specifically, the "optimal positions of the rotation positioners 10 at a time when holding the steel frame structure W", which are calculated by the positioner position calculation means 51*a*, are positions of the rotation positioners 10 in which it is possible to securely hold the steel frame structure W while enabling the steel frame structure W to be welded without generating a malfunction.

In the present embodiment, the database DB is described as storing the optimal positions of the rotation positioners 10 at a time when holding the steel frame structure W but is just exemplary. For example, the database DB may also have a configuration in which positions other than the optimal positions of the rotation positioners 10 at a time when holding the steel frame structure W are stored. Specifically, the positions of the rotation positioners 10 may not be the optimal positions as long as the rotation positioners 10 are in a state where the rotation positioners 10 can hold the steel frame structure W while enabling the steel frame structure W to be welded without generating a malfunction. Therefore, there is no problem that the database DB has a configuration in which positions other than the optimal positions of the rotation positioners 10 at a time when holding the steel frame structure W are stored.

The positioner position calculation means 51*a* is configured to calculate positions of the rotation positioners 10 in which the steel frame structure W can be held in the optimal positions, based on the reference position S as the reference position information received from the workpiece position setting mechanism 41 and workpiece information inputted into the PC 51 of the control device 50 in advance.

The program automatic generation means 51*b* is configured to automatically generate an operating program for moving the rotation positioners 10 and the welding robot 30 to the optimal positions of the rotation positioners 10 at a time when holding the steel frame structure W, which are calculated by the positioner position calculation means 51*a*. Note that, the database DB may be data accumulated by a learning device, and AI (Artificial Intelligence) technology can also be used.

(1-4-2. Positioner Control Unit)

The positioner control unit 52 is configured to control the rotation positioners 10 and the welding robot 30 and to move the same to the positions of the rotation positioners 10 calculated by the positioner position calculation means 51*a*, according to the operating program automatically generated by the PC 51.

(1-4-3. Welding Robot Control Unit)

The welding robot control unit 53 is to control the welding operation of the welding robot 30, and has a synchronous control unit 53*a*. The welding robot control unit 53 is configured to control an operation of the manipulator 32, power that is supplied to the welding torch 31, supply of the welding wire and the like to weld a weld part of the steel frame structure W, based on the operating program generated by the PC 51 on the basis of the workpiece information such as size data, welding position data or gravity center data and the like of the steel frame structure W or an operating program stored in advance in the welding robot control unit.

At this time, the synchronous control unit 53*a* is configured to control an operation of the manipulator 32 of the welding robot 30 and an operation of the rotation positioners 10 so as to be synchronized with each other. Specifically, when welding the arc part of the steel frame structure W by the welding robot 30, the welding is performed while synchronizing the rotation of the steel frame structure W and the operation of the welding robot 30. In addition, as required, the synchronous control unit 53*a* is configured to move the welding robot 30 in synchronization with movement of the rotation positioners 10 moving in the length direction of the steel frame structure W, in response to a command from the PC 51.

<2. Welding Procedure>

Subsequently, a welding procedure of the steel frame structure W by the welding system 1 is sequentially described with reference to FIGS. 1, 3 and 5. Note that, FIG. 3 is an outline configuration view of the welding system shown in FIG. 1, as seen from above, and FIG. 5 is a flowchart showing a welding procedure by the welding system shown in FIG. 1.

First, the carriage 43 for a workpiece position setting mechanism is moved along the moving rails R1 for a positioner, and the workpiece position setting mechanism 41 is positioned to any position. Thereby, the reference surface 42 of the workpiece position setting mechanism 41 is set as the reference position S of the steel frame structure W. Note that, although the position of the workpiece position setting mechanism 41 is arbitrarily determined, it is preferably set the same to a position in which a welding work area of the steel frame structure W does not overlap other work areas, for example.

Figure 5:
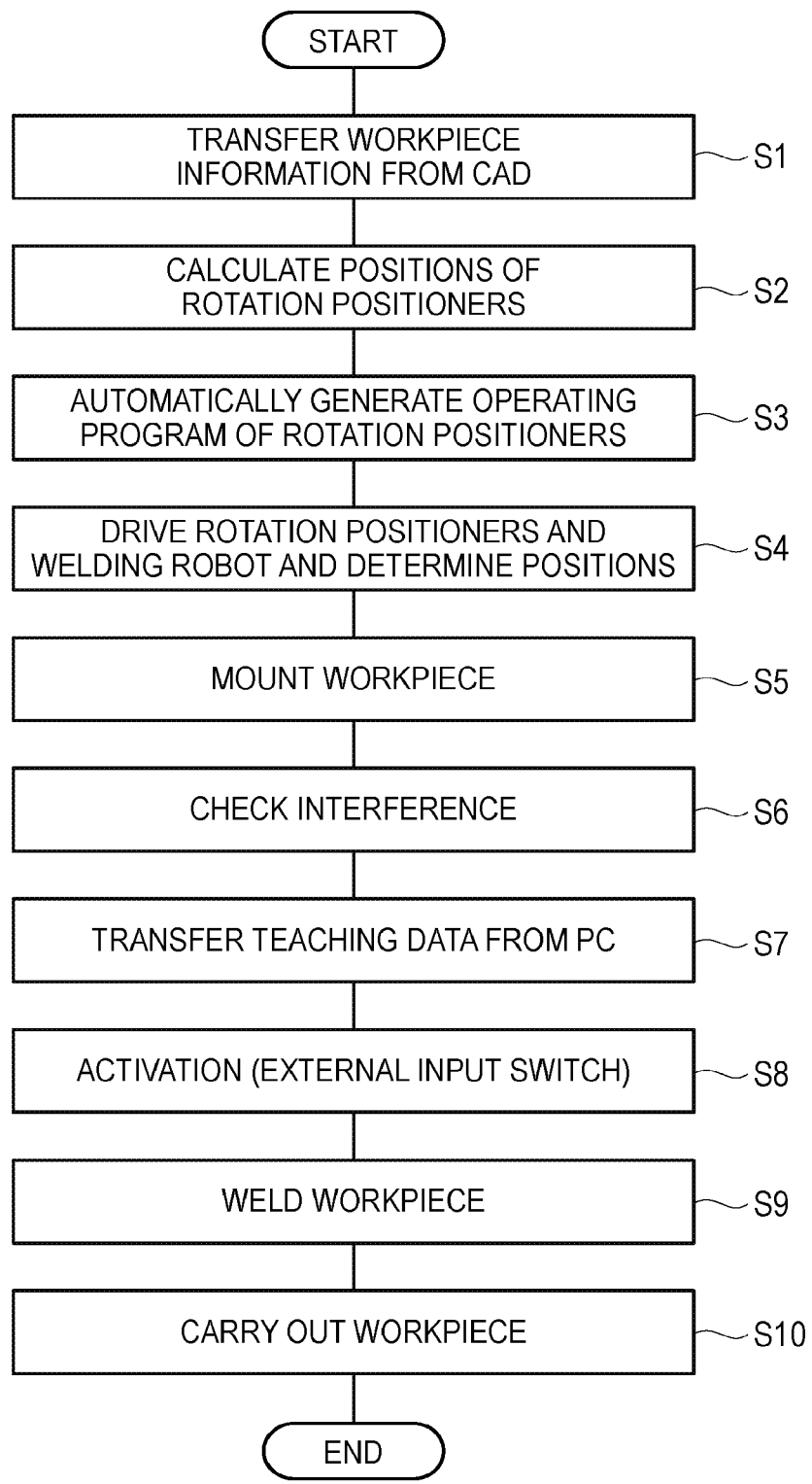
FIG. 5 is a flowchart showing a welding procedure by the welding system shown in FIG. 1.

As shown in step S1 in FIG. 5, the workpiece information such as size data, welding position data or gravity center data and the like of the steel frame structure W is input in advance to the PC 51 by an operator's manual input, an input from CAD (Computer-Aided Design) data of the steel frame structure W, and the like. Note that, although the input method of the workpiece information is not particularly limited, 3D CAD data is preferably used from a standpoint of improving work efficiency.

Then, as shown in step S2 in FIG. 5, the positioner position calculation means 51a of the PC 51 calculates the positions of the rotation positioners 10 in which the steel frame structure W can be held in the optimal positions, based on the reference position information received from the workpiece position setting mechanism 41 and the workpiece information input in advance to the PC 51 of the control device 50. Specifically, the positioner position calculation means 51a assumes a virtual steel frame structure W whose one end is in contact with the reference surface 42 of the workpiece position setting mechanism 41, and determines the optimal holding positions for the virtual steel frame structure W and calculates the positions of the rotation positioners 10, from the database DB in which the optimal positions of the rotation positioners 10 at a time when holding the steel frame structure W are stored for each of the workpiece information.

Note that, in a case where the gravity center data of the steel frame structure W is included as the workpiece information, the optimal holding positions are calculated, considering the gravity center data, so that the steel frame structure W can be held in a stable state and the welding work can be performed with high accuracy.

As shown in step S3 in FIG. 5, the program automatic generation means 51b of the PC 51 automatically generates the operating program for moving the rotation positioners 10 to the positions of the rotation positioners 10 calculated by the positioner position calculation means 51a, and transmits the same to the positioner control unit 52.

As shown in step S4 in FIG. 5, the positioner control unit 52 moves the carriages 14 for a rotation positioner along the moving rails R1 for a rotation positioner, thereby moving the rotation positioners 10 to the positions of the rotation positioners 10 calculated by the positioner position calculation means 51a, according to the operating program generated by the program automatic generation means 51b.

Note that, the movement of the rotation positioners 10 to the calculated positions is preferably performed by controlling the position of the driven-side rotation positioner 10B, based on the position of the drive-side rotation positioner 10A. Thereby, the position accuracy of the drive-side rotation positioner 10A and the driven-side rotation positioner 10B is increased.

Then, as shown in step S5 in FIG. 5, the elevating arm mechanisms 12 are actuated to divide and open the upper parts of the annular holders 11 (refer to FIG. 2A), and the steel frame structure W is then conveyed and mounted on the fixing jigs 16 by a crane or the like. When mounting the steel frame structure W on the fixing jigs 16, one end of the steel frame structure W becoming the reference surface is brought into contact with the reference surface 42 of the workpiece position setting mechanism 41 for determining the position in the length direction of the steel frame structure W, and then the steel frame structure is clamped and fixed from all around by the plurality of fixing jigs 16. Then, the annular holders 11 are closed, and the workpiece position setting mechanism 41 is moved and retreated away from the steel frame structure W. Thereby, the rotation of the steel frame structure W by the rotation positioners 10 can be performed.

Subsequently, as shown in step S6 in FIG. 5, the PC 51 checks that each part has no interference, and as shown in step S7, transfers teaching data such as a welding position, a welding sequence, a welding method and the like to the welding robot control unit 53.

The welding robot control unit 53 starts a welding work of the steel frame structure W by the welding robot 30, as shown in step S9, based on an activation command from an external input switch shown in step S8 in FIG. 8. Specifically, for example, based on the operating program stored in the PC 51 or the welding robot control unit 53, the welding robot control unit 53 implements the welding work of the steel frame structure W while moving the welding robot 30. Note that, the linear part in the length direction of the steel frame structure W is welded without rotating the steel frame structure W while moving the carriage 20 for a welding device and a control device, specifically, the welding robot 30 in the length direction of the steel frame structure W along the moving rails R2 for a welding device and a control device or moving the slider mechanism 22 in the direction orthogonal to the length direction of the steel frame structure W. In addition, the linear part may be welded by actuating the manipulator 32 with 6-axis joints of the welding robot 30 without moving a main body of the welding robot 30.

The arc part of the steel frame structure W is welded by controlling the welding robot 30 in synchronization with rotation of the fixing jigs 16 by the synchronous control unit 53a while driving the drive unit M to rotate the annular holders 11, thereby rotating the steel frame structure W held by the fixing jigs 16.

After the welding of the steel frame structure W is completed, the upper parts of the annular holders 11 are opened by the elevating arm mechanisms 12 and the steel frame structure W is carried out, as shown in step S10 in FIG. 5, so that the welding work is ended.

As described above, according to the welding system of the present embodiment, it is possible to automatically calculate and determine the optimal positions of the rotation positioners 10 at a time when holding the steel frame structure W, which depends on the operator's experience in the related art. Specifically, it is possible to perform efficient work by automating the work for positioning the rotation positioners 10.

Note that, the present invention is not limited to the above embodiment and can be modified and improved as appropriate. For example, in the above embodiment, the pair of rotation positioners 10 has been described as the holding mechanism of the steel frame structure W. However, one holding mechanism or three or more holding mechanisms can also be possible as long as it is possible to hold the steel frame structure W.

As described above, the present specification discloses following matters.

(1) A welding system configured to weld a workpiece by using a welding device and a positioner, the welding system including:
   a control device configured to control the welding device and the positioner,
   wherein the positioner includes a workpiece position setting mechanism having reference position information, and at least one holding mechanism configured to hold the workpiece, and wherein the control device includes a positioner position calculation means for calculating a position of the holding mechanism when holding the workpiece based on the reference position information provided from the workpiece position setting mechanism and workpiece information inputted into the control device in advance.

According to the configuration, it is possible to automatically calculate and determine a position of the positioner at a time when holding the workpiece, so that it is possible to perform efficient work by automating the work for positioning the positioner.

(2) The welding system according to the above (1), wherein the control device has a database in which the position of the holding mechanism at a time when holding the workpiece is stored for each of the workpiece information, and
  wherein the positioner position calculation means calculates the position of the holding mechanism at a time when holding the workpiece by referring to the database.

According to the configuration, it is possible to calculate holding positions, according to a variety of workpieces.

(3) The welding system according to the above (1) or (2), wherein the workpiece information includes at least one data of welding position data and size data of the workpiece.

According to the configuration, it is possible to correctly perceive a size and a welding position of the workpiece.

(4) The welding system according to one of the above (1) to (3), wherein the control device includes a synchronous control unit configured to perform control such that an operation of the welding device and an operation of the positioner are synchronized with each other.

According to the configuration, it is possible to continuously perform the welding without cutting the arc even when welding an arc part of the workpiece by synchronizing the operations of the welding device and the positioner.

(5) The welding system according to one of the above (1) to (4), wherein the welding device is a welding robot, and
  wherein each of the welding robot and the positioner has a moving shaft for enabling movement in parallel.

According to the configuration, even when the welding robot and the holding mechanism move, it is possible to keep relative positions of the welding robot and the holding mechanism.

(6) The welding system according to the above (5), wherein the positioner has two or more holding mechanisms,
  wherein when one of the holding mechanisms is set as a drive-side holding mechanism and other of the holding mechanisms is set as a driven-side holding mechanism, each of the drive-side holding mechanism and the driven-side holding mechanism has a servo motor for positioning to a predetermined position, and
  wherein the control device is configured to control a position of the driven-side holding mechanism based on a position positioned in the drive-side holding mechanism, with respect to the position of the holding mechanism at a time when holding the workpiece calculated by the positioner position calculation means.

According to the configuration, the position accuracy of the relative positions of the drive-side holding mechanism and the driven-side holding mechanism increases.

(7) The welding system according to one of the above (1) to (6), wherein the control device has a program automatic generation means for automatically generating an operating program for moving the holding mechanism and the welding device to the position of the holding mechanism at a time when holding the workpiece calculated by the positioner position calculation means.

According to the configuration, it is possible to automatically generate the operating program, so that work efficiency is improved.

(8) The welding system according to one of the above (1) to (7), wherein the workpiece information includes gravity center data of the workpiece, and
  wherein the positioner position calculation means calculates the position of the holding mechanism at a time when holding the workpiece by referring to the gravity center data.

According to the configuration, the holding mechanism can hold the workpiece in a stable state.

(9) A control device of a welding system configured to weld a workpiece by using a welding device and a positioner,
  wherein the control device is to control the welding device and the positioner, and
  wherein the control device includes a positioner position calculation means for calculating a position of a holding mechanism of the positioner at a time when holding the workpiece based on reference position information provided from a workpiece position setting mechanism of the positioner and workpiece information inputted into the control device in advance.

According to the configuration, it is possible to automatically calculate and determine a position of the positioner at a time when holding the workpiece, so that it is possible to perform efficient work by automating the work for positioning the positioner.

(10) A control program of a welding system configured to weld a workpiece by using a welding device and a positioner,
  wherein the control program is to control the welding device and the positioner, and
  wherein the control program includes a positioner position calculation step of calculating a position of a holding mechanism of the positioner at a time when holding the workpiece based on reference position information provided from a workpiece position setting mechanism of the positioner and workpiece information inputted into the control program in advance.

According to the configuration, it is possible to automatically calculate and determine a position of the positioner at a time when holding the workpiece, so that it is possible to perform efficient work by automating the work for positioning the positioner.

(11) A welding method of welding a workpiece by using a welding device and a positioner, the welding method including:
  a process of controlling the welding device and the positioner by a control device configured to control the welding device and the positioner,
  wherein the positioner includes a workpiece position setting mechanism having reference position information, and at least one holding mechanism configured to hold the workpiece, and
  wherein the welding method includes a process of calculating a position of the holding mechanism at a time when holding the workpiece based on the reference position information provided from the workpiece position setting mechanism and workpiece information inputted into the control device in advance.

According to the configuration, it is possible to automatically calculate and determine a position of the positioner at a time when holding the workpiece, so that it is possible to perform efficient work by automating the work for positioning the positioner.

Although the various embodiments have been described with reference to the drawings, the present invention is not limited thereto. It is apparent to one skilled in the art that a variety of changes or modifications can be made within the scope defined in the claims and are included within the technical scope of the present invention. In addition, the respective constitutional elements in the above embodiments may be arbitrarily combined without departing from the gist of the invention.

The present application is based on Japanese Patent Application No. 2019-067011 filed on Mar. 29, 2019, the contents of which are incorporated herein by reference.

REFERENCE SIGNS LIST

1: welding system
10: rotation positioner (holding mechanism)
10A: drive-side rotation positioner (drive-side holding mechanism)
10B: driven-side rotation positioner (driven-side holding mechanism)
11: annular holder
11a: gear
11b: arc part
12: elevating arm mechanism
13: bracket
14: carriage for rotation positioner
16: fixing jig
20: carriage for welding device and control device
21: wheel
22: slider mechanism
30: welding robot (welding device)
31: welding torch
32: manipulator
40: positioner
41: workpiece position setting mechanism
42: reference surface
43: carriage for workpiece position setting mechanism
50: control device
51: PC
51a: positioner position calculation means
51b: program automatic generation means
52: positioner control unit
53: welding robot control unit
53a: synchronous control unit
DB: database
M: drive unit
R1: moving rail (moving shaft) for positioner
R2: moving rail (moving shaft) for welding device and control device
S: reference position (reference position information)
W: steel frame structure (workpiece)

The invention claimed is:

1. A welding system configured to weld a workpiece, the welding system comprising:
a welding device:
a positioner including a workpiece position setting mechanism having reference position information;
a control device configured to control the welding device and the positioner; and
at least one holding mechanism configured to hold the workpiece,
wherein the control device comprises a positioner position calculator for calculating a position of the holding mechanism when holding the workpiece based on the reference position information provided from the workpiece position setting mechanism and workpiece information inputted into the control device in advance,
wherein the workpiece position setting mechanism is movable along moving rails for the positioner, the moving rails being parallel to a length direction of the workpiece, and
wherein a side surface of the work piece position setting mechanism is provided with a reference surface for setting a reference position in the length direction of the workpiece by bringing one end of the workpiece into contact with the reference surface.

2. The welding system according to claim 1,
wherein the control device has a database in which the position of the holding mechanism at a time when holding the workpiece is stored for each of the workpiece information, and
wherein the positioner position calculator calculates the position of the holding mechanism at a time when holding the workpiece by referring to the database.

3. The welding system according to claim 1,
wherein the workpiece information comprises at least one data of welding position data and size data of the workpiece.

4. The welding system according to claim 1,
wherein the control device comprises a synchronous control unit configured to perform control such that an operation of the welding device and an operation of the positioner are synchronized with each other.

5. The welding system according to claim 1,
wherein the welding device is a welding robot, and
wherein each of the welding robot and the positioner has a moving shaft for enabling movement in parallel.

6. The welding system according to claim 5,
wherein the positioner has two or more holding mechanisms,
wherein when one of the holding mechanisms is set as a drive-side holding mechanism and other of the holding mechanisms is set as a driven-side holding mechanism, each of the drive-side holding mechanism and the driven-side holding mechanism has a servo motor for positioning to a predetermined position, and
wherein the control device is configured to control a position of the driven-side holding mechanism based on a position positioned in the drive-side holding mechanism, with respect to the position of the holding mechanism at a time when holding the workpiece calculated by the positioner position calculator.

7. The welding system according to claim 1,
wherein the control device has a program automatic generator for automatically generating an operating program for moving the holding mechanism and the welding device to the position of the holding mechanism at a time when holding the workpiece calculated by the positioner position calculator.

8. The welding system according to claim 1,
wherein the workpiece information includes gravity center data of the workpiece, and
wherein the positioner position calculator calculates the position of the holding mechanism at a time when holding the workpiece by referring to the gravity center data.

9. A control device of a welding system configured to weld a workpiece by using a welding device and a positioner, wherein the control device is configured to control the welding device and the positioner, wherein the control device comprises a positioner position calculator for calculating a position of a holding mechanism of the positioner at a time when holding the workpiece based on reference position information provided from a workpiece position setting mechanism of the positioner and workpiece information inputted into the control device in advance, wherein the workpiece position setting mechanism is movable along moving rails for the positioner, the moving rails being parallel to a length direction of the workpiece, and wherein a side surface of the work piece position setting mechanism is provided with a reference surface for setting a reference position in the length direction of the workpiece by bringing one end of the workpiece into contact with the reference surface.

10. A welding method of welding a workpiece by using a welding device and a positioner, the welding method comprising:

a process of controlling the welding device and the positioner by a control device configured to control the welding device and the positioner, wherein the positioner comprises a workpiece position setting mechanism having reference position information, and at least one holding mechanism configured to hold the workpiece, wherein the welding method comprises a process of calculating a position of the holding mechanism at a time when holding the workpiece based on the reference position information provided from the workpiece position setting mechanism and workpiece information inputted into the control device in advance, wherein the workpiece position setting mechanism is movable along moving rails for the positioner, the moving rails being parallel to a length direction of the workpiece, and wherein a side surface of the work piece position setting mechanism is provided with a reference surface for setting a reference position in the length direction of the workpiece by bringing one end of the workpiece into contact with the reference surface.

11. The welding system according to claim 2,
wherein the workpiece information comprises at least one data of welding position data and size data of the workpiece.

12. The welding system according to claim 2,
wherein the control device comprises a synchronous control unit configured to perform control such that an operation of the welding device and an operation of the positioner are synchronized with each other.

13. The welding system according to claim 2,
wherein the welding device is a welding robot, and
wherein each of the welding robot and the positioner has a moving shaft for enabling movement in parallel.

14. The welding system according to claim 2,
wherein the control device has a program automatic generator for automatically generating an operating program for moving the holding mechanism and the welding device to the position of the holding mechanism at a time when holding the workpiece calculated by the positioner position calculator.

15. The welding system according to claim 2,
wherein the workpiece information includes gravity center data of the workpiece, and
wherein the positioner position calculator calculates the position of the holding mechanism at a time when holding the workpiece by referring to the gravity center data.

* * * * *